United States Patent
Caldwell et al.

(10) Patent No.: US 7,966,963 B1
(45) Date of Patent: Jun. 28, 2011

(54) OWL WITH INTERMITTENT POWERED MOVEMENT

(75) Inventors: E. Neal Caldwell, Knoxville, TN (US); John Kevin Hodges, Powell, TN (US)

(73) Assignee: Dalen Products, Inc., Knoxville, TN (US)

( * ) Notice: Subject to any disclaimer, the term of this patent is extended or adjusted under 35 U.S.C. 154(b) by 102 days.

(21) Appl. No.: 12/567,319

(22) Filed: Sep. 25, 2009

(51) Int. Cl.
*A01M 29/00* (2006.01)
*A01M 29/06* (2006.01)

(52) U.S. Cl. .............................. 116/22 A; 43/2; 446/352

(58) Field of Classification Search ................ 116/22 A, 116/22 R; 43/1–3; 40/411, 414, 417, 466, 40/470; 446/199, 311, 330, 352, 353, 365, 446/376, 379, 381–384, 391; D11/162; D21/606
See application file for complete search history.

(56) References Cited

U.S. PATENT DOCUMENTS

| | | |
|---|---|---|
| 278,461 A | 5/1883 | Screven |
| 954,288 A | 4/1910 | Holloway |
| 1,066,045 A | 7/1913 | Pass |
| 1,167,502 A | 1/1916 | Huffman et al. |
| 1,286,380 A | 12/1918 | Matthews |
| 1,287,968 A | 12/1918 | Greenleaf |
| 2,545,801 A | 3/1951 | Wrazen |
| 2,575,252 A | 11/1951 | Berger |
| 2,722,195 A | 11/1955 | Rockafeller |
| 2,788,762 A * | 4/1957 | Wright .................. 116/22 A |
| 2,799,960 A * | 7/1957 | Riley ......................... 43/3 |
| 3,085,545 A | 4/1963 | Ore |
| 3,290,817 A | 12/1966 | Kravath |
| 3,487,569 A | 1/1970 | Mendall |
| 3,735,514 A | 5/1973 | Asder |
| 3,818,630 A | 6/1974 | May |
| 4,038,639 A | 7/1977 | Kuebler |
| 4,131,079 A | 12/1978 | Rousseau, Jr. et al. |
| 4,239,825 A | 12/1980 | Kaulfuss et al. |
| 4,597,357 A | 7/1986 | LeMessurier |
| 5,112,265 A | 5/1992 | Naum |
| 5,274,942 A | 1/1994 | Lanius |
| 5,289,654 A | 3/1994 | Denny et al. |
| 5,316,516 A * | 5/1994 | Saitoh ..................... 446/175 |
| 5,901,491 A | 5/1999 | Caldwell |
| 5,960,577 A | 10/1999 | Walterson |
| 7,048,605 B2 | 5/2006 | Hawthorne et al. |
| 7,246,569 B2 * | 7/2007 | Grandy et al. ............ 116/22 A |
| 7,255,060 B2 * | 8/2007 | Grandy ................... 116/22 A |
| 2006/0053675 A1 * | 3/2006 | Lindaman .................. 43/2 |
| 2007/0062093 A1 * | 3/2007 | Hess ........................ 43/3 |

FOREIGN PATENT DOCUMENTS

WO       WO 03059058 A1    7/2003

* cited by examiner

*Primary Examiner* — Amy Cohen Johnson
(74) *Attorney, Agent, or Firm* — Luedeka, Neely & Graham, PC (57) ABSTRACT

An owl replica for deterring pests, having a plastic owl body; a plastic owl head; an unstable mount disposed between the body and head for free movement of the head relative to the body; and a powered assembly supported by the mount and operable to move with the mount relative to the body and enable intermittent powered movement of the head relative to the body without interfering with free movement of the head.

8 Claims, 6 Drawing Sheets

OWL WITH INTERMITTENT POWERED MOVEMENT

FIELD

This disclosure relates to the field of devices for protecting crops. More particularly, this disclosure relates to devices for use in a garden which replicate the shape of predators and move in response to wind and also have intermittent powered movement to frighten birds, rabbits and garden pests.

BACKGROUND

U.S. Pat. No. 5,901,491 relates to devices for deterring pests, including a replica of an owl having a head that moves. The head is mounted for free movement relative to a body portion such that a small amount of wind will cause the head to move relative to the body portion. It has been observed that an owl replica having such head movement is effective in deterring pests. However, on very calm or essentially windless days, it has been observed that the head has reduced movement, which can detract from the effectiveness of the owl in deterring pests.

The present disclosure advantageously provides improved devices for deterring pests that enables intermittent powered movement of the device, even in the absence of wind, to frighten birds, rabbits and garden pests, and which does not interfere with any wind-powered or free movement of the device.

SUMMARY

The above and other needs are met by a replica of an owl for use in a garden for deterring pests.

In one embodiment, the replica comprising a first body portion corresponding generally in shape to the body of a live owl; a second body portion corresponding generally in shape to the head of a live owl; an unstable mount disposed between the first and second body parts, the second body portion being mounted by said mount adjacent an upper portion of the first body portion for movement relative to the first body portion to simulate movement of an owl's head; and an electromechanical assembly supported by the mount. The electromechanical assembly is operable to move with the mount relative to the first body portion and enable intermittent powered movement of the second body part relative to the first body part without interfering with free movement of the second body part.

In another aspect, the disclosure relates to a device for deterring animal pests, the device including a body portion configured to resemble a body portion of a predator of such pests; a head portion configured to resemble a head portion of the predator; structure for movably mounting the head portion to the body portion such that the head portion is freely moveable in a rotational, back-and-forth, and side-to-side relationship relative to the body portion; and an electromechanical assembly supported by the upper pivot assembly.

The structure for movably mounting the head includes an upper pivot assembly balanced onto a lower pivot assembly, the upper pivot assembly being rigidly connected to the head portion and the lower pivot assembly being rigidly connected to the body portion. The electromechanical assembly includes an electrical power source, an electronic actuator, and a kicker assembly. Activation of the electronic actuator results in movement of the kicker assembly against a portion of the lower pivot assembly to impart motion to the second body portion.

In yet another aspect, the disclosure relates to a device for deterring animal pests having a body portion configured to resemble a body portion of a predator of such pests; a head portion configured to resemble a head portion of the predator; structure for movably mounting the head portion to the body portion such that the head portion is freely moveable in a rotational, back-and-forth, and side-to-side relationship relative to the body portion; and an electromechanical assembly supported by the upper pivot assembly The structure for movably mounting the head includes an upper pivot assembly balanced onto a lower pivot assembly, the upper pivot assembly being rigidly connected to the head portion and the lower pivot assembly being rigidly connected to the body portion. The electromechanical assembly includes a solar cell, a capacitor charged by the solar cell, a solenoid, a timer circuit periodically activating the solenoid, and a kicker connected to the solenoid. Activation of the solenoid results in movement of the kicker to strike a portion of the lower pivot assembly to impart motion to the head portion.

The disclosure thus describes an improved pest deterring device that offers powered movement to supplement wind movement to enhance the effectiveness of the device.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

With reference to the drawings, the disclosure relates to a system for deterring garden pests, such as rabbits, birds, and the like. The system includes a replica of a predator of such pests, such as a hawk, owl, fox, or the like, having a body resembling the body of the predator, a head resembling the head of the predator, structure for movably mounting the head to the body so that the head is freely movable in a rotational, back-and-forth, and side-to-side relationship relative to the body, and structure that enables intermittent powered movement of the head relative to the body and does not interfere with any free movement of the head.

Figure 1:
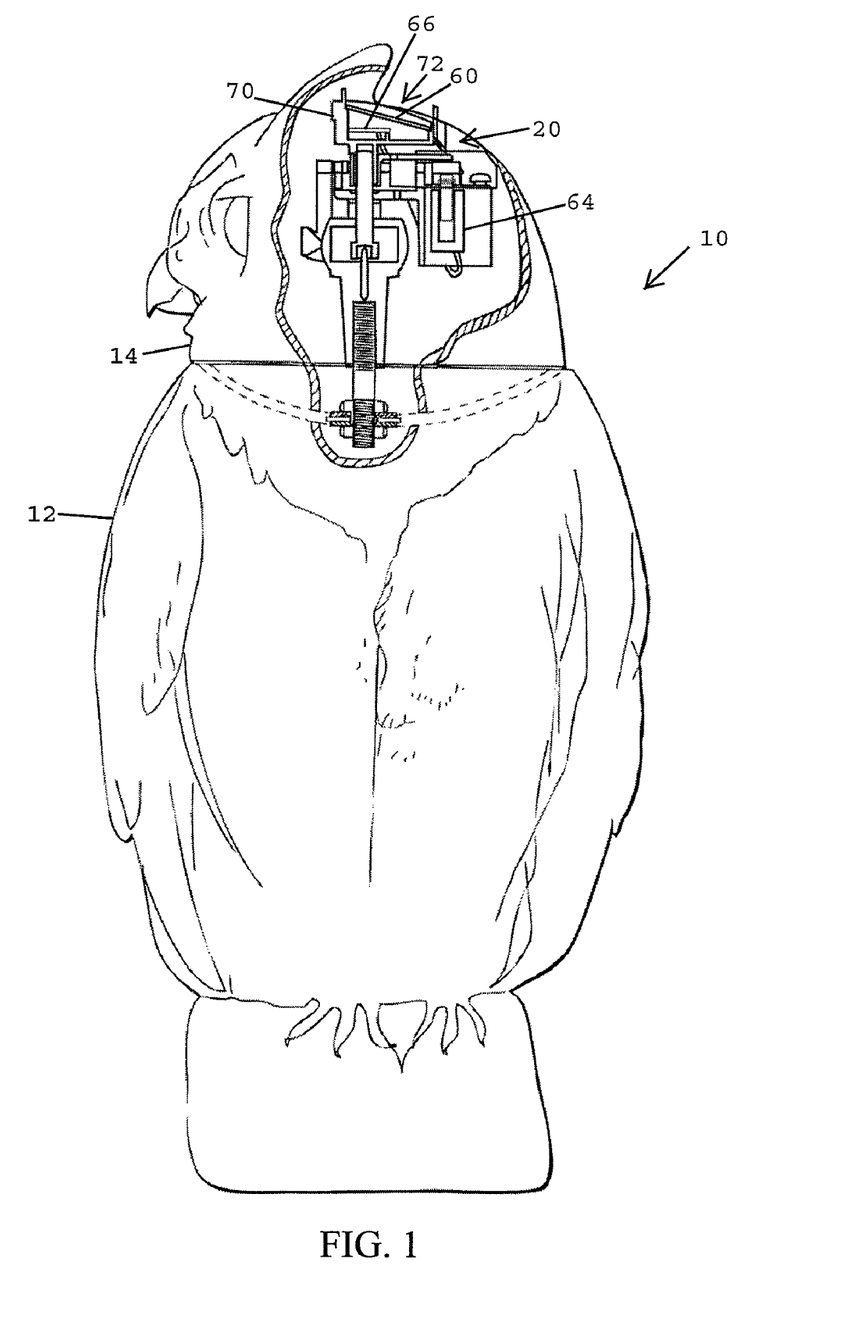
FIG. 1 is a frontal view of an owl replica according to the disclosure, with portions of the head and body cutaway to reveal structure which enables free movement and intermittent electrically powered movement of the head relative to the body, and which does not interfere with any free movement of the device.

With reference to FIG. 1, there is shown an owl replica 10 having a body 12 and a head 14 located above the body 12. The body 12 and the head 14 correspond to the head and body of the owl replica described in U.S. Pat. No. 5,901,491, entitled "Owl With Movable Head," issued May 11, 1999, and incorporated by reference herein in its entirety.

The owl replica 10 includes a lower pivot assembly 16 rigidly connected to the body 12 and an upper pivot assembly 18 rigidly connected to the head 14 and balanced onto the lower pivot assembly 18. The upper pivot assembly 18 and the lower pivot assembly 16 cooperate to provide an unstable mount suitable to movably mount the head 14 to the body 12 so that the head 14 is freely movable in a rotational, back-and-forth, and side-to-side relationship relative to the body 12. Movement of the head 14 relative to the body 12 may be generated as by slight air movement to cause circular rotational movement of the head 14, in addition to nodding and/or rocking movement of the head 14 to imitate head movements of a live owl to provide a deterrent effect on garden pests of the type commonly preyed upon by owls.

However, as extended periods of time may pass on a still day without air movement sufficient to generate movement of the head 14, the replica 10 also includes an electromechanical assembly 20 that enables intermittent powered movement of the head 14 relative to the body 12 and does not interfere with any free movement of the head 14 provided by the lower pivot assembly 16 and the upper pivot assembly 18. In this manner, movement of the head 14 may be assured, even on very calm or still days.

Figure 2:
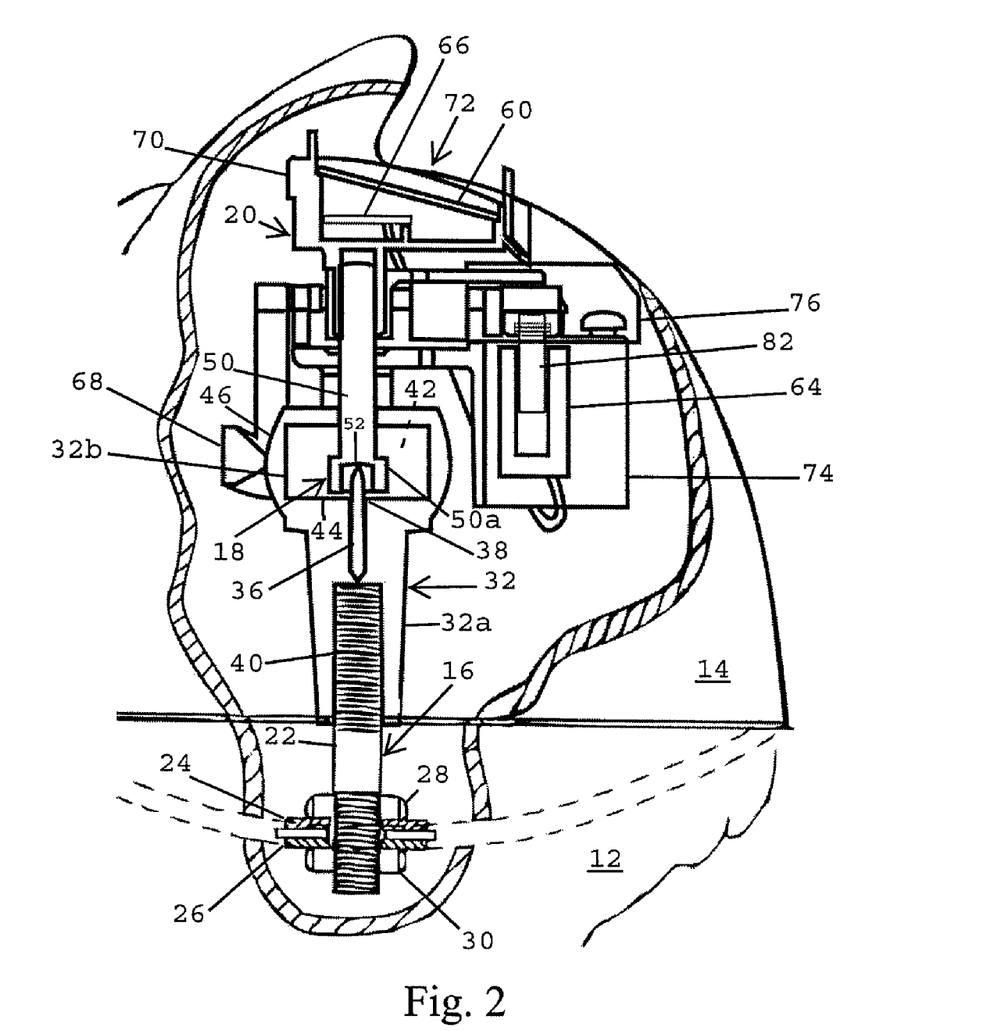
FIG. 2 is an enlarged view of a portion of the structure of FIG. 1 which enables free movement and intermittent electrically powered movement of the head.

The lower pivot assembly 16 includes a threaded bolt 22 having a pair of washers 24 and 26 and a pair of nuts 28 and 30 receivable upon a lower end of the bolt 22. Mounting of the lower assembly 16 onto the body 12 may be accomplished by passing the bolt 22 through an aperture provided through an upper portion of the body 12 and securing the bolt 22 in place using the washers 24 and 26 and the bolts 28 and 30.

The opposite upper end of the bolt 22 is threadably received within a lower portion 32a of a needle housing 32 opposite an upper cup-shaped portion 32b. The cup-shaped portion 32b may include flexion slots 34 to facilitate assembly. A needle 36 extends through an aperture 38 provided along the central vertical axis of the housing 32 between the lower portion 32a and the upper portion 32b of the housing 32 such that an upper pointed end of the needle 36 penetrates into the openness of the cup-shaped portion 32b and a lower, flattened end of the needle 36 rests against the upper end of the bolt 22.

Figure 3:
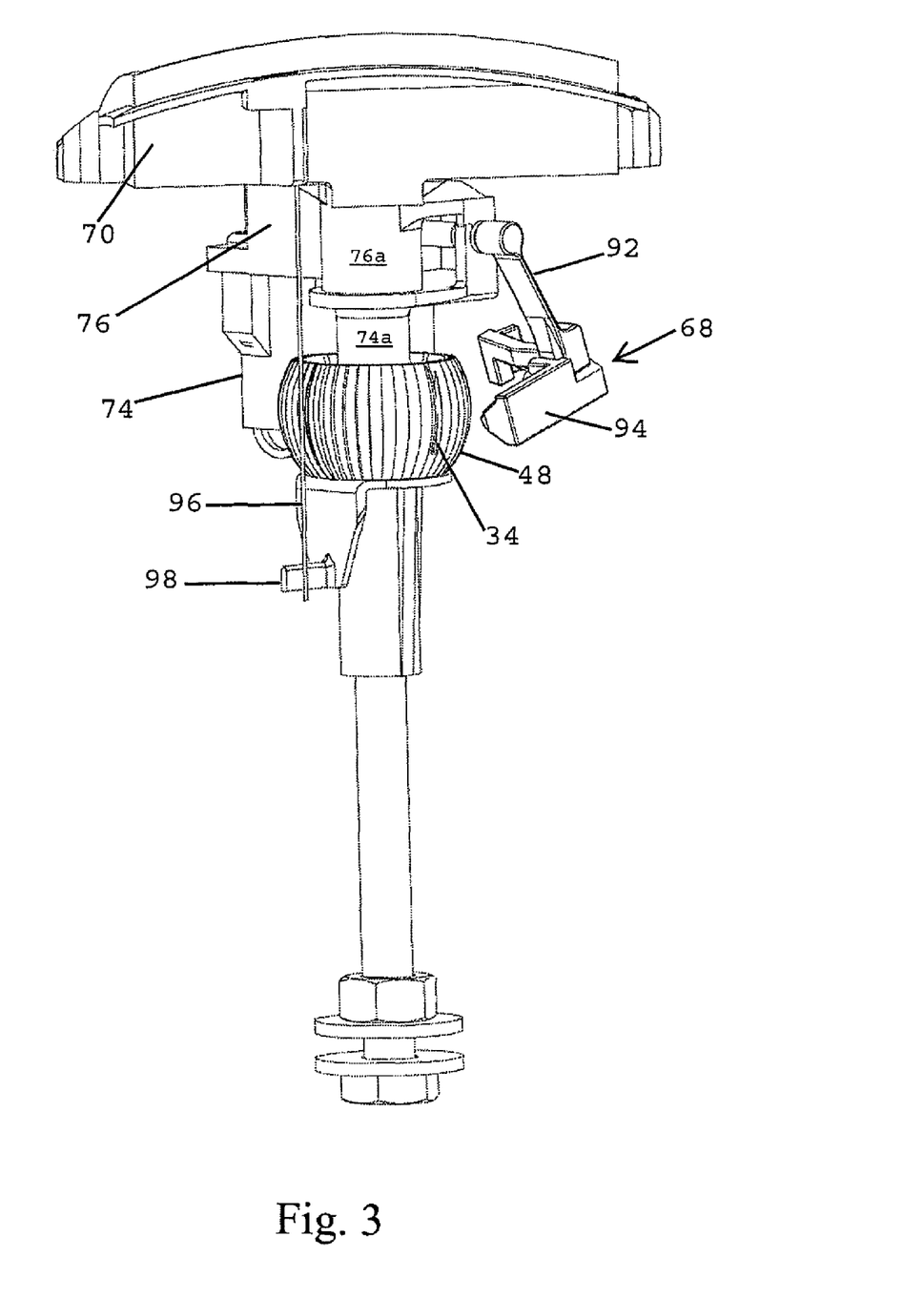
FIGS. 3 and 4 are perspective views of structure of the replica of FIG. 1 that enables intermittent electrically powered movement.
Figure 4:
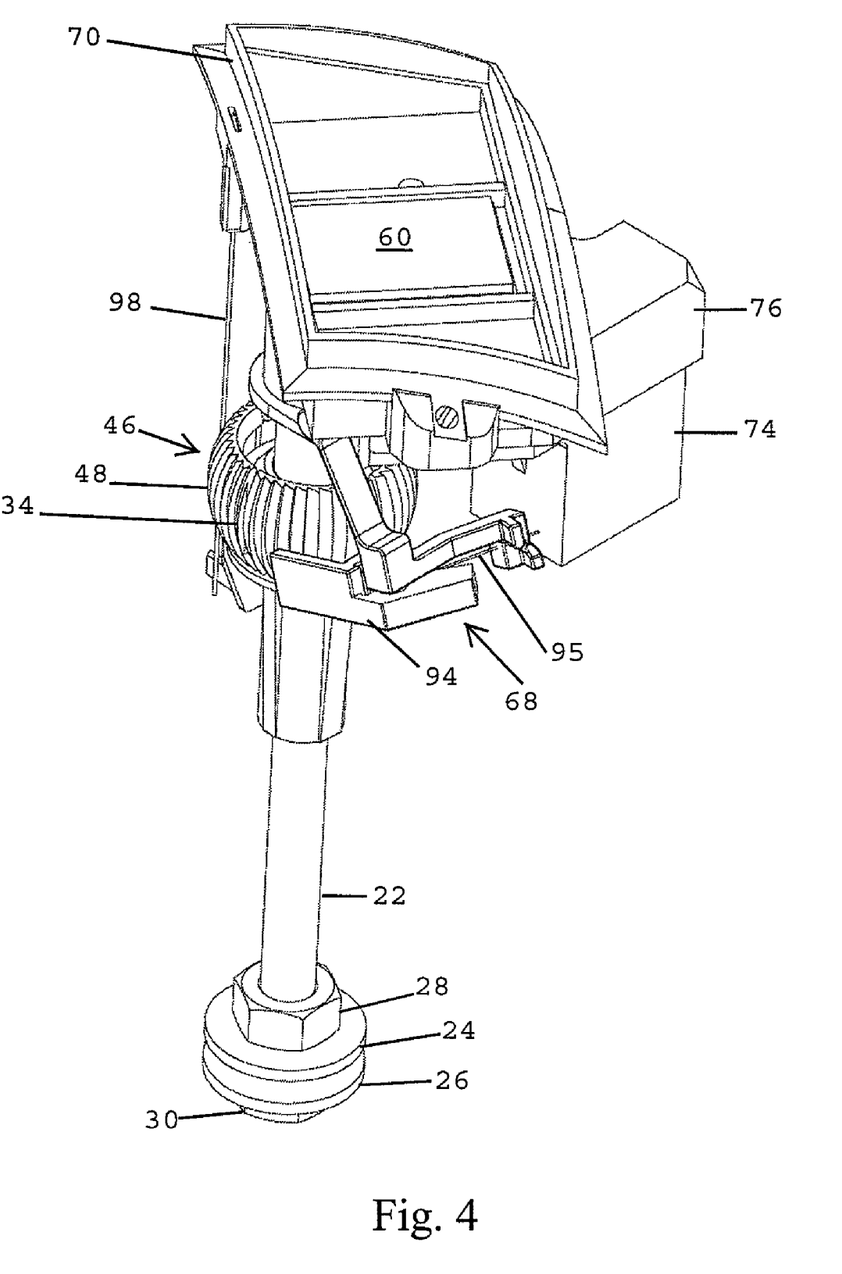

The lower portion 32a of the housing 32 includes a blind bore 40 below the aperture 38 configured to threadably receive the bolt 36. The aperture 38 is sized to frictionally engage the needle 36 so that it is snugly retained by the aperture 38. The upper portion 32b of the housing 32 includes a blind bore 42 having a circular bottom 44, with the aperture 38 extending through the bottom 36 so that the point of the needle 36 extends into the bore 42 when the needle 36 is inserted into the aperture 38. A spherical sidewall 46 extends upwardly from the bottom 44. The sidewall 46 includes a rugous exterior surface 48 (FIG. 3) that cooperates with the electromechanical assembly 20 as explained below. The sidewall 46 is also slotted to enable the sidewall to expand to permit passage of a washer component during assembly.

The upper pivot assembly 18 includes an elongate pivot member 50 having a pivot surface 52 located at the lower end of the pivot member 50 and positionable in contact with the upper end of the needle 36. The pivot member 50 may be provided by a socket head cap screw, with the exposed end of a socket head 50a thereof providing the pivot surface 52. The pivot member 50 is threadably received by a portion of the electromechanical assembly 20, which is rigidly connected to the head 14.

It is desirable to position the head 14 and the body 12 relative to one another so as to not detract from the realism of the owl replica 10, and the head 14 is countersunk into the body 12 to enhance the realistic appearance of the replica and to avoid diminishment of this appearance during movement of the head 14. To promote realistic movement of the head 14, the head 14 is balanced and the pivot point defined by the juncture between the point of the needle 36 and the pivot surface 52 is preferably selected to coincide with a point slightly above the center of gravity of the head 14 so that the head 14 tends to return to a level position when the head is undisturbed as during the absence of wind. If desired, ballast such as weights may be secured by crimping or by adhesive to the inner surface of the owl head to provide desired adjustment to the center of gravity.

As discussed above, the electromechanical assembly 20 enables intermittent electrically powered movement of the head 14 relative to the body 12 and does not interfere with any free movement of the head 14 provided by the lower pivot assembly 16 and the upper pivot assembly 18. The electromechanical system 20 includes as major components an electrical power source, provided as by a solar cell 60, an electrical power storage device, provided as by a capacitor 62, an electronic actuator, provided as by a solenoid 64 controlled by a timer circuit located on a printed circuit board 66, and a kicker assembly 68 connected to the solenoid 64.

In brief overview, the power source (solar cell 60) and the power storage device (capacitor 62) as controlled by the timer circuit (circuit board 66) enable intermittent or periodic operation of the electronic actuator (solenoid 64). The kicker 68 is connected to the solenoid 64 and activation of the solenoid 64 results in movement of the kicker 68. The kicker assembly 68 is located and configured when moved to strike the spherical sidewall 46 of the lower assembly 16 to impart motion to the head 14. After the kicker assembly 68 strikes the sidewall 46, the kicker assembly 68 returns to its initial position not in contact with the sidewall 46. The spherical sidewall 46 advantageously enables intermittent contact therewith by the kicker assembly 68 sufficient to impart motion to the head 14, even if the head 14 is already in motion. Furthermore, the intermittent striking of the kicker assembly 68 with the sidewall 46 is only momentary, i.e., the kicker assembly 68 quickly impacts the sidewall 46 and is then quickly withdrawn. Thus, the kicker assembly 68 does not detract from any free movement of the head 14 enabled by the upper and lower pivot assemblies.

The solar cell 60 is installed as a cover onto a bracket 70 mounted within the head 14 and positioned relative to an aperture 72 located on the head 14 so that the solar cell 60 may be exposed to sunlight. The solar cell 60 charges the capacitor 62 that is electrically connected to the circuit board 66 located within the bracket 70. The capacitor 62 is secured to the inside surface of the owl head 14 and is connected to the solar cell 60 and the circuit board 66 as by wiring. The capacitor 62 is located on the interior of the head 14 generally opposite the solenoid 64 so as to serve as a counter-balance to offset the weight of the solenoid 64. In this regard, it will be understood that additional counterweights may be utilized so as to render the head 14 substantially balanced for desirable head movement.

It will be understood that the solar cell 60 functions to sufficiently charge the capacitor 62 even in relatively low light conditions for desired periodic movement of the head 14 (e.g. every 2 to 3 minutes). For the purpose of example, a suitable solar cell has the following electrical characteristics: 5.5 volt, 0.19 watt, 35 milliamps; a suitable capacitor: 10,000 µf, 10 volt; and a suitable solenoid: 1.5 volt, 2.8 ohm.

There is typically not a need to deter pests during the night. Thus, the use of the solar cell 60 as the energy source is desirable in that it is light weight and low maintenance. However, if desired, a battery or other electrical source may be used to charge the capacitor 62. In addition, the kicker assembly 68 may alternatively be connected to a mechanical assembly, such as a spring or rubber band powered motor, which is wound and includes suitable timing structure to allow periodic release of mechanical energy to move the kicker assembly 68.

The solenoid 64 is located within a lower housing 74 below an upper housing 76 that is mounted to the upper pivot assembly 18. The bracket 70 having the solar cell 60 and circuit 66 is mounted to the head 14 but is rotatably seated, as by a nylon bushing 78 above the upper housing 76, such that the electromechanical assembly 20 together with the head 14 are supported by and move with the upper pivot assembly 18 relative to the lower pivot assembly 16 and the body 12. In this regard, it will be understood that the bracket 70 is rotatably stacked onto the upper housing 76, and the lower housing 74 is secured below the upper housing 76 with the upper housing 76 and the lower housing 74 each mounted in a cantilever fashion by arms 76a and 74a, respectively, to the upper pivot assembly 18. The arm 74a of the housing 74 rests upon a washer 80 located on the pivot member 50 and seated upon the head 50a of the pivot member 50. This arrangement of the components, together with the counter-balance positioning of the capacitor 64 described above advantageously enables incorporation of the electromechanical assembly 18 into the balanced arrangement of the upper and lower pivot assemblies without detracting therefrom. As will be appreciated, in the construction, and depending upon the profile of the head, e.g., owl, fox, hawk, and the weights of specific components, additional minor counterbalancing may be indicated within the head 14.

Figure 5:
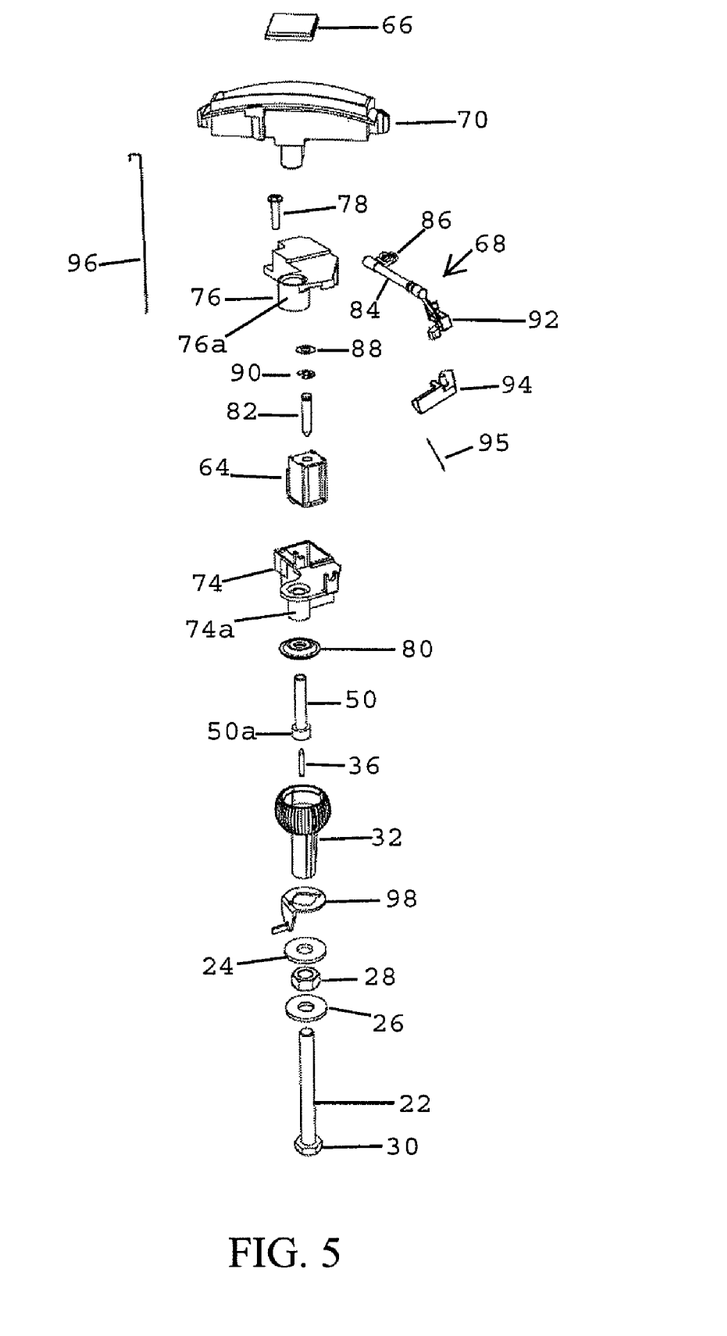
FIG. 5 is an exploded perspective view of the structure of FIGS. 3 and 4.

The solenoid 64 functions to convert electrical energy supplied thereto into linear motion, causing movement of a rod 82 extending from the solenoid 64. This results in movement of the kicker assembly 68 that is attached to the rod 82. With reference to FIG. 5, the kicker assembly 68 includes an elongate member 84, the proximal end thereof having a mount 86 configured for cooperating with a washer 88 and a retaining ring 90 for mounting of the mount 86, and hence the elongate member 84, onto the rod 82. The distal end of the elongate member 84 includes a pawl 92 pivotally mounted onto the distal end of the rod 82. A striking member 94 is pivotally connected to the pawl 92 and configured for striking the spherical sidewall 46 when the rod 82 moves and causes pivoting of the pawl 92. The striking member 94 is configured to desirably impact the rugous surface 48 of the spherical sidewall 46 when the rod 82 moves.

In this regard, it will be appreciated that the configuration of the spherical sidewall 46 of the upper portion 32b of the housing 32 renders the housing 32 available to be struck by the striking member 94 regardless of whatever the orientation of the housing 32 due to rotational, bobbing, rocking or other motion or non-motion of the head 14.

The pawl 92 rotates away from the sidewall 46 after the striking member 94 impacts the sidewall 46. In this regard, the pawl 92 is configured to have a center of gravity located to maintain the striking member 94 in a ready position spaced from the sidewall 46. A light wire or spring 95 is provided between the pawl 92 and the striking member 94 to bias the pawl 92 out of the way so that the pawl 92 does not contact the spherical sidewall 46 of the lower assembly 16.

As will be appreciated, the upper and lower pivot assemblies 16 and 18 cooperate to enable the upper assembly to rotate and/or gyroscopically pivot so that the head 14 may rotate 360 degrees relative to the body 12 and/or rock from side to side and/or nod from front to back. However, if desired, the rotation and other movement may be governed with stop or limiting devices, such as providing a wire 96 connected to the upper pivot assembly 18, such as by mounting on the bracket 70, and aligned with the length axis of the pivot member 50, for contacting a stop 98 mounted on the lower pivot assembly 16. Thus, the wire 96 and stop 98 may cooperate to change the direction of movement of the head 14 in the manner of a gust of wind or the like acting upon the head 14. This can provide a more varied free movement of the head 14 which enhances visibility to pests of the movement of the head 14.

The electromechanical assembly 20 will be understood to not interfere with the free movement of the head 14. That is, while the assembly 20 causes movement, the movement is free as enabled by the pivot assemblies 16 and 18. Thus, the electromechanical assembly 20 acts in the manner of wind, and does not interfere with the free movement of the head 14.

Figure 6:
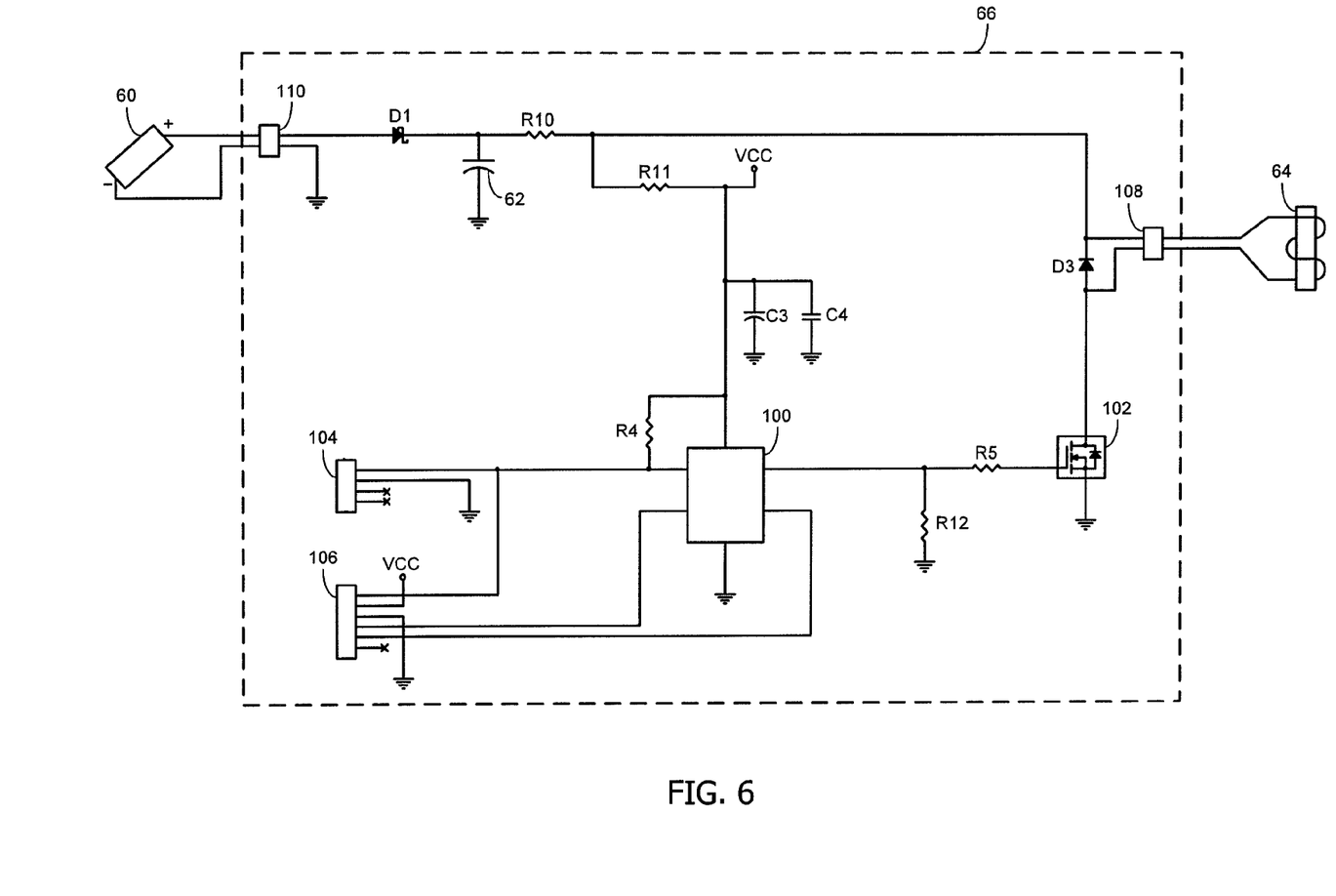
FIG. 6 shows a diagram of an electrical circuit for use with the owl replica.

With reference to FIG. 6, the printed circuit 66 includes a microcontroller 100 which controls activation of the solenoid 64 at periodic intervals. In a preferred embodiment, the microcontroller 100 is a model number PIC10F220 manufactured by Microchip Technology. As long as the microcontroller 100 is receiving power from the solar cell 60, it periodically produces a voltage signal which is provided to the gate of a MOSFET switch 102. The voltage on the gate of the switch 102 causes the switch 102 to "close", thereby allowing the capacitor 62 to discharge through the solenoid 64. The current flowing through the solenoid 64 causes movement of the rod 82. In a preferred embodiment, the switch 102 is an N-channel MOSFET device having a model number DMN3150L manufactured by Diodes Inc, and the capacitor 62 is a 10,000 microfarad aluminum electrolytic radial capacitor manufactured by Panasonic ECG under model number ECA-1AM103.

As shown in FIG. 6, the solenoid 64 and the solar cell 60 are preferably connected to the printed circuit board 66 through a connector 108 and a connector 110, respectively. In preferred embodiments, the printed circuit board includes a test connector 104 and a programming connector 106, both connected to the microcontroller 100.

Values of other components depicted in the embodiment of FIG. 6 are listed in Table I. Those skilled in the art will appreciate that other components having different values could be used in other embodiments. Accordingly, the invention is not limited to any particular combination of electrical components or values.

TABLE I

| Component | Value |
|---|---|
| Diode D1 | Schottky 100 mA 30 V |
| Diode D3 | Rectifier 1A 50 V |
| Capacitor C3 | 10 µF 6.3 V ceramic |
| Capacitor C4 | 10 nF 6.3 V ceramic |
| Resistor R4 | 10 KΩ 10 W |
| Resistor R5 | 100 Ω 10 W |
| Resistor R11 | 10 Ω 10 W |
| Resistor R12 | 20 KΩ 10W |

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A replica of an owl for use in a garden for deterring pests, the replica comprising a first body portion corresponding generally in shape to the body of a live owl; a second body portion corresponding generally in shape to the head of a live owl; an unstable mount disposed between the first and second body portions, the second body portion being mounted by said mount adjacent an upper portion of the first body portion for movement relative to the first body portion to simulate movement of an owl's head; and a powered assembly supported by the mount and operable to move with the mount relative to the first body portion and enable intermittent powered movement of the second body portion relative to the first body portion without interfering with free movement of the second body portion; wherein the powered assembly comprises an electromechanical assembly, and the electromechanical assembly comprises an electrical power source, an electronic actuator, and a kicker assembly, wherein activation of the electronic actuator results in movement of the kicker assembly against a portion of the unstable mount to impart motion to the second body portion.

2. The replica of claim 1, further comprising an electrical storage device.

3. The replica of claim 2, wherein the electrical power source comprises a solar cell, the electronic actuator comprises a solenoid, and the electrical storage device comprises a capacitor.

4. A device for deterring animal pests, the device comprising a body portion configured to resemble a body portion of a predator of such pests; a head portion configured to resemble a head portion of the predator; structure for movably mounting the head portion to the body portion such that the head portion is freely moveable in a rotational, back-and-forth, and side-to-side relationship relative to the body portion, the structure for movably mounting the head comprising an upper pivot assembly balanced onto a lower pivot assembly, the upper pivot assembly being rigidly connected to the head portion and the lower pivot assembly being rigidly connected to the body portion; and an electromechanical assembly supported by the upper pivot assembly, the electromechanical assembly comprising an electrical power source, an electronic actuator, and a kicker assembly, wherein activation of the electronic actuator results in movement of the kicker assembly against a portion of the lower pivot assembly to impart motion to the second body portion.

5. The device of claim 4, wherein the predator comprises an owl.

6. The device of claim 4, wherein the electromechanical assembly enables intermittent powered movement of the head portion relative to the body portion without interfering with free movement of the head portion.

7. A device for deterring animal pests, the device comprising a body portion configured to resemble a body portion of a predator of such pests; a head portion configured to resemble a head portion of the predator; structure for movably mounting the head portion to the body portion such that the head portion is freely moveable in a rotational, back-and-forth, and side-to-side relationship relative to the body portion, the structure for movably mounting the head comprising an upper pivot assembly balanced onto a lower pivot assembly, the upper pivot assembly being rigidly connected to the head portion and the lower pivot assembly being rigidly connected to the body portion; and an electromechanical assembly supported by the upper pivot assembly, the electromechanical assembly comprising a solar cell, a capacitor charged by the solar cell, a solenoid, a timer circuit periodically activating the solenoid, and a kicker connected to the solenoid, wherein activation of the solenoid results in movement of the kicker to strike a portion of the lower pivot assembly to impart motion to the head portion.

8. The device of claim 7, wherein the solenoid includes a rod that moves when the solenoid is activated and the kicker comprises a pawl pivotally mounted to the rod and a sticking member connected to the pawl for striking a portion of the lower assembly.

* * * * *